US009043369B2

(12) United States Patent
Israel et al.

(10) Patent No.: US 9,043,369 B2
(45) Date of Patent: May 26, 2015

(54) METADATA BROKERING SERVER AND METHODS

(71) Applicant: Hillcrest Laboratories, Inc., Rockville, MD (US)

(72) Inventors: Bruce Israel, Bethesda, MD (US); Charles W. K. Gritton, Sterling, VA (US); Frank A. Hunleth, Rockville, MD (US); Stephen Scheirey, Urbana, MD (US); Daniel S. Simpkins, Bethesda, MD (US); Ryan Stoner, Chicago, IL (US); Yizhong Wang, Boyds, MD (US)

(73) Assignee: HILLCREST LABORATORIES, INC., Rockville, MD (US)

( * ) Notice: Subject to any disclaimer, the term of this patent is extended or adjusted under 35 U.S.C. 154(b) by 0 days.

(21) Appl. No.: 13/847,114

(22) Filed: Mar. 19, 2013

(65) Prior Publication Data

US 2013/0291009 A1    Oct. 31, 2013

Related U.S. Application Data

(63) Continuation of application No. 13/436,954, filed on Apr. 1, 2012, now Pat. No. 8,412,748, which is a continuation of application No. 12/371,687, filed on Feb. 16, 2009, now Pat. No. 8,161,082, which is a (Continued)

(51) Int. Cl.
*G06F 17/30* (2006.01)
*H04N 21/81* (2011.01)
*H04L 29/08* (2006.01)

(52) U.S. Cl.
CPC .......... *H04N 21/81* (2013.01); *G06F 17/30038* (2013.01); *Y10S 707/99945* (2013.01); *Y10S 707/99948* (2013.01); *H04L 67/2804* (2013.01)

(58) Field of Classification Search
CPC .................. G06F 17/30038; Y10S 707/99948
USPC ......................................................... 707/803
See application file for complete search history.

(56) References Cited

U.S. PATENT DOCUMENTS 6,681,227 B1    1/2004 Kojima et al.
7,000,825 B2    2/2006 Alexander et al.
(Continued)

FOREIGN PATENT DOCUMENTS

CN    101099149 B    12/2011
EP    1349080 A1    10/2003
(Continued)

OTHER PUBLICATIONS

First Examination Report issued in corresponding Indian application No. 4024/DELNP/2006, dated Feb. 19, 2013.
(Continued)

*Primary Examiner* — Cheryl Lewis
(74) *Attorney, Agent, or Firm* — Patent Portfolio Builders PLLC

(57) ABSTRACT

Exemplary embodiments of the present invention provide methods and systems for supplying rich multimedia metadata usable to generate, e.g., sophisticated entertainment user interfaces in the home. These methods and systems can be implemented as a server-based software application that feeds multiple, diverse clients. The server functionality could be distributed, even co-located physically with one or more clients, or centralized. The server aggregates, filters, validates, augments and links metadata from disparate sources. The server transforms the metadata into a more manageable and extensible internal format. The server communicates with client devices using a schema-independent protocol, providing metadata in the appropriate format that suites the clients needs.

33 Claims, 11 Drawing Sheets

Related U.S. Application Data continuation of application No. 11/037,897, filed on Jan. 18, 2005, now Pat. No. 7,493,341.

(60) Provisional application No. 60/536,937, filed on Jan. 16, 2004.

(56) References Cited

U.S. PATENT DOCUMENTS

| | | | |
|---|---|---|---|
| 7,054,859 B2 | 5/2006 | Kuno et al. | |
| 7,206,853 B2 | 4/2007 | Eytchison et al. | |
| 7,493,341 B2 | 2/2009 | Israel et al. | |
| 8,161,082 B2 | 4/2012 | Israel et al. | |
| 8,230,360 B2* | 7/2012 | Ma et al. | 715/810 |
| 8,412,748 B2* | 4/2013 | Israel et al. | 707/803 |
| 2002/0052757 A1 | 5/2002 | Lewis | |
| 2003/0018607 A1 | 1/2003 | Lennon et al. | |
| 2003/0195863 A1 | 10/2003 | Marsh | |
| 2004/0002993 A1 | 1/2004 | Toussaint et al. | |
| 2004/0268393 A1 | 12/2004 | Hunleth et al. | |
| 2005/0050070 A1 | 3/2005 | Sheldon | |
| 2009/0063976 A1* | 3/2009 | Bull et al. | 715/716 |
| 2010/0070917 A1* | 3/2010 | Gates et al. | 715/810 |
| 2010/0076983 A1* | 3/2010 | Gates et al. | 707/749 |

FOREIGN PATENT DOCUMENTS

| | | |
|---|---|---|
| JP | 2002024250 A | 1/2002 |
| JP | 2003-330856 A | 11/2003 |
| JP | 2005-521309 A | 7/2005 |
| JP | 2005-526340 A | 9/2005 |
| JP | 4981454 B2 | 7/2012 |
| KR | 10-114393 | 4/2012 |
| KR | 10-1167827 | 7/2012 |
| WO | 9915995 A1 | 4/1999 |
| WO | 01/37135 A2 | 5/2001 |
| WO | 03/019560 A2 | 3/2003 |

OTHER PUBLICATIONS

Office Action in corresponding European Patent Application No. 05 705 760.6-2201 mailed Jun. 14, 2010.
Office Action in corresponding Japanese Patent Application No. 2006-549648 mailed Aug. 10, 2010.
Office Action in corresponding Korean Patent Application No. 10-2006-7014292 mailed Mar. 30, 2011.
Office Action in corresponding Japanese Application No. 2006-549648 mailed Mar. 29, 2011.
Written Opinion in corresponding International Application No. PCT/US2005/001323 mailed Nov. 14, 2006.
Supplemental European Search Report in corresponding European Divisional Application No. EP 10 01 1832 dated May 31, 2011.
Final Office Action in corresponding Japanese Patent Application No. 2006-549648 mailed Oct. 18, 2011.
International Search Report in corresponding International Application No. PCT/US2005/001323 mailed Nov. 14, 2006.
Supplemental Search Report in corresponding European Application No. EP 05 705 760 mailed Dec. 20, 2007.
Office Action in corresponding Chinese Application No. 200580002649.6 mailed Aug. 21, 2009.
Office Action in corresponding U.S. Patent No. 7,493,341 issued on Jun. 18, 2007.
Office Action in corresponding U.S. Patent No. 7,493,341 issued on Mar. 26, 2008.
Office Action in corresponding U.S. Patent No. 7,493,341 issued on Sep. 8, 2008.
Office Action in corresponding Chinese Application No. 200580002649.6 mailed Jul. 11, 2008.
Office Action in corresponding Chinese Divisional No. Application No. 200910215510.X mailed Jun. 23, 2011.
Office Action in corresponding Chinese Divisional No. Application No. 200910215510.X mailed Feb. 28, 2012.
Office Action in corresponding European Application No. EP 05 705 760 mailed Feb. 29, 2008.
Extended European Search Report in corresponding European Divisional Application No. EP 10 011 832.2 mailed Jun. 27, 2011.
European Search Report in corresponding European Divisional Application No. EP 10 011 832.2 published Jul. 13, 2011.
Office Action in corresponding Korean Patent No. 10-1141393 mailed Mar. 30, 2011.
Office Action in corresponding Korean Divisional Application No. 10-2011-7018065 mailed Mar. 23, 2011.
Office Action in corresponding U.S. 1st Continuation Patent No. 8,161,082 dated Jun. 9, 2011.
Office Action in corresponding U.S. 1st Continuation Patent No. 8,161,082 dated Oct. 23, 2011.
Office Action issued in corresponding Chinese Divisional Application No. 200910215510.X, mailed Sep. 24, 2012.
Office Action issued in corresponding Chinese Divisional Application No. 200910215510.X, mailed Feb. 28, 2012.
Office Action issue in corresponding U.S. 1st Continuation Patent No. 8,161,082, dated Oct. 24, 2011.
Final Office Action issued in corresponding Japanese Patent Application No. 2006-549648, mailed Oct. 18, 2011.
Office Action issued in corresponding Korean Divisional Application No. 10-2011-7018065, mailed Sep. 23, 2011.
Japanese Office Action in corresponding Japanese Patent Application No. 2012-032541 dated Mar. 12, 2013.
Nobuhiko Takada, et al.; "Construction of the Papers Reference System on Web in XML"; IEICE Transaction on Information and Systems, Pt. 1 (Japanese Edition); University of Osaka Prefect; vol. J84-D-1; No. 6; ISSN: 0915-1915; Jun. 1, 2001; pp. 650-657; Japan. (Abstract only).
Chinese Office Action in corresponding Chinese Patent Application No. 200910215510.X dated Mar. 15, 2013, with partial English translation.
Japanese Office Action in corresponding Japanese Application No. 2012-032541 dated Jan. 9, 2014.

* cited by examiner

FIG. 2

DRAMA

APOLLO 13 (1995)
Length: 120 Minutes   Price: $3.99   [BUY / WATCH TRAILER / BACK]

Massively popular, fast-paced retelling of near-disaster space mission. Much to enjoy for fans of suspense and special effects. Well-developed characters appeal even to those who don't like typical Hollywood epics.

Actors: Tom Hanks, Bill Paxton, Kevin Bacon, Gary Sinise, Ed Harris

Tom Hanks

American leading actor Tom Hanks has become one of the most popular stars in contemporary American cinema. Born July 9, 1956, in Concord, CA.

Rated by Empire Magazine as 17th out of The Top 100 Movie Stars of All Time in October 1997, Hanks is married to actress Rita Wilson, with whom he appeared in Volunteers (1985).

Filmography
Saving Private Ryan
The Green Mile
Forrest Gump
Road to Perdition
Apollo 13
Philadelphia
Toy Story
Cast Away

FIG. 3

| Metadata Categories | | TV_Browser/PVR | TMS | Gemstar | MSO | VOD_Browser | Muze | IMDB | AllMovieGuide | Music_Browser | AllMovieGuide | Muze | Gracenote | Freedb.org | Musicbrainz.org |
|---|---|---|---|---|---|---|---|---|---|---|---|---|---|---|---|
| Content | Title | X | X | X | X | X | X | X | X | X | X | X | X | X | X |
| | Year | X | X | | | X | X | X | X | | X | X | X | | |
| | Studio/Publisher | | M | | | | | X | X | | X | X | | | |
| | Episode Name | X | X | | | X | | | | | | | | | |
| | Synopsis | X | X | | | X | | X | | | | | | | |
| | Description | X | X | | | X | | X | | | | | | | |
| | Plot Keywords | X | | | | X | | X | | | | | | | |
| | Producer | | X | | | X | | X | | | | | | | |
| | Director | | X | | | X | | X | X | | | | | | |
| | Principal Cast | X | X | | | X | | X | X | | | | | | |
| | Extended Cast | | | | | | X | | | | | | | | |
| | Artist | | | | | | | | | | X | | X | X | X |
| | Writers | | X | | | X | | X | X | | | | | | |
| | Category | X | | | | X | | | | | | | | | |
| | Genre | X | X | | | X | | X | X | X | X | | X | X | |
| | Airing (P,F,R) | X | X | X | | | | | | | | | | | |
| | Runtime | X | X | | | X | | X | X | X | X | | X | X | X |
| | Rating | X | X | | | X | | X | | X | | | | | |
| | Picture/Cover art | X | | | | X | | X | X | D | X | X | | | ? |
| | Tracks | | | | | X | ? | | | D | X | | X | X | X |
| | Trailers | | | | | X | | | | | | | | | |
| | Content Lookup | | | | | X | | | | | | | X | X | X |
| Cast | Bios | | | | | X | | X | X | | X | | | | |
| | Credits | | | | | X | | ? | | | | | | | |
| | Photo | | X | | | X | | | | | | | | | |
| Collaborative | User Rating | | | | | | | X | | | | | | | |
| | Editorial Rating | | M | | | | | X | X | | X | | | | |
| | Critical Reviews | | | | | | | X | X | | X | | | | |
| | Links to other Media | | | | | | | X | X | | X | | | | |
| Instance | System ID | X | X | | X | X | | | | | | | | | |
| | Time | X | X | | | | | | | | | | | | |
| | Location | X | X | | X | X | | | | | | | | | |
| | Price | | P | | | X | | X | | | | | | | |
| | Usage Restrictions | | | | | X | | | | | | | | | |
| | Copy Restrictions | | | | | X | | | | | | | | | |

FIG. 5A

Receive

502 — Data comes in from data source
From Comcast
The Movie Seabiscuit
Released in 2003
Directed by Gary Ross
Rating PG
Genre Drama
Starring: Jeff Bridges, William H Macy
Desc: True story of the undersized
        Depression-era racehorse
Based on book by Laura Hillenbrand 504 — Data comes in from data source
From HBO
The Movie Seabiscuit
Released in 2003
Directed by Gary Ross
Rating PG
Genre Drama
Starring: Jeff Bridges, Tobey Maguire
Desc: Uplifting story about an
        undersized horse.
Runtime: 141 min Filter 506 — Unused information removed
From Comcast
The Movie Seabiscuit
Released in 2003
Directed by Gary Ross
Rating PG
Genre Drama
Starring: Jeff Bridges, William H Macy
Desc: True story of the undersized
        Depression-era racehorse
Based on book by Laura Hillenbrand 508 — No filtering needed
From HBO
The Movie Seabiscuit
Released in 2003
Directed by Gary Ross
Rating PG
Genre Drama
Starring: Jeff Bridges, Tobey Maguire
Desc: Uplifting story about an
        undersized horse.
Runtime: 141 min Map 510 — Data from multiple feeds merged into unified repository
The Movie Seabiscuit
Released in 2003
Directed by Gary Ross
Rating PG
Genre Drama
Starring: Jeff Bridges, William H Macy, Tobey Maguire
Desc (from Comcast): True story of the undersized Depression-era racehorse
Desc (from HBO): Uplifting story about an undersized horse.
Runtime: 141 min

METADATA BROKERING SERVER AND METHODS

RELATED APPLICATIONS

This application is a continuation of U.S. patent application Ser. No. 13/436,954, filed on Apr. 1, 2012, now U.S. Pat. No. 8,412,748 entitled, "Metadata Brokering Server and Methods", which is a continuation of U.S. patent application Ser. No. 12/371,687, filed Feb. 16, 2009, now U.S. Pat. No. 8,161,082 which issued on Apr. 17, 2012, which is a continuation of U.S. patent application Ser. No. 11/037,897, filed Jan. 18, 2005, now U.S. Pat. No. 7,493,341 which issued on Feb. 17, 2009, which is related to, and claims priority from, U.S. Provisional Patent Application Ser. No. 60/536,937, filed on Jan. 16, 2004, entitled "Metadata Brokering Server", the disclosure of which is incorporated here by reference.

BACKGROUND

The present invention describes systems and methods for supplying multimedia metadata usable to create, for example, sophisticated entertainment user interfaces in the home.

Technologies associated with the communication of information have evolved rapidly over the last several decades. Television, cellular telephony, the Internet and optical communication techniques (to name just a few things) combine to inundate consumers with available information and entertainment options. Taking television as an example, the last three decades have seen the introduction of cable television service, satellite television service, pay-per-view movies and video-on-demand. Whereas television viewers of the 1960s could typically receive perhaps four or five over-the-air TV channels on their television sets, today's TV watchers have the opportunity to select from hundreds and potentially thousands of channels of shows and information. Video-on-demand technology, currently used primarily in hotels and the like, provides the potential for in-home entertainment selection from among thousands of movie titles. Digital video recording (DVR) equipment such as offered by TiVo, Inc., 2160 Gold Street, Alviso, Calif. 95002, further expand the available choices.

The technological ability to provide so much information and content to end users provides both opportunities and challenges to system designers and service providers. One challenge is that while end users typically prefer having more choices rather than fewer, this preference is counterweighted by their desire that the selection process be both fast and simple. Unfortunately, the development of the systems and interfaces by which end users access media items has resulted in selection processes which are neither fast nor simple. Consider again the example of television programs. When television was in its infancy, determining which program to watch was a relatively simple process primarily due to the small number of choices. One would consult a printed guide which was formatted, for example, as series of columns and rows which showed the correspondence between (1) nearby television channels, (2) programs being transmitted on those channels and (3) date and time. The television was tuned to the desired channel by adjusting a tuner knob and the viewer watched the selected program. Later, remote control devices were introduced that permitted viewers to tune the television from a distance. This addition to the user-television interface created the phenomenon known as "channel surfing" whereby a viewer could rapidly view short segments being broadcast on a number of channels to quickly learn what programs were available at any given time.

Despite the fact that the number of channels and amount of viewable content has dramatically increased, the generally available user interface and control device options and frameworks for televisions have not changed much over the last 30 years. Printed guides are still the most prevalent mechanism for conveying programming information. The multiple button remote control with simple up and down arrows is still the most prevalent channel/content selection mechanism. The reaction of those who design and implement the TV user interface to the increase in available media content has been a straightforward extension of the existing selection procedures and interface objects. Thus, the number of rows and columns in the printed guides has been increased to accommodate more channels. The number of buttons on the remote control devices has been increased to support additional functionality and content handling. However, this approach has significantly increased both the time required for a viewer to review the available information and the complexity of actions required to implement a selection. Arguably, the cumbersome nature of the existing interface has hampered commercial implementation of some services, e.g., video-on-demand, since consumers are resistant to new services that will add complexity to an interface that they view as already too slow and complex.

An exemplary control framework having a zoomable graphical user interface for organizing, selecting and launching media items is described in U.S. patent application Ser. No. 10/768,432, filed on Jan. 30, 2004, to Frank A. Hunleth, the disclosure of which is incorporated here by reference. This framework provides exemplary solutions to the aforedescribed problems of conventional interfaces. Among other things, such exemplary frameworks provide mechanisms which display metadata associated with media items available for selection by a user in a manner which is easy-to-use, but allows a large number of different media items to be accessible.

The creation of these types of advanced user interfaces is hamstrung by the type and availability of rich metadata that describes the content. The term "metadata" as it is used herein refers to all of the supplementary information that describes the particular content of interest associated with media items available for selection by a user. As an example for movies, the metadata could include, e.g., the title, description, genre, cast, DVD cover art, price/availability, and rights associated with the content among others. Beyond this it could include cast bios and filmographies, links to similar movies, critical reviews, user reviews, and the rights associated with the metadata itself. It could also include advertising metadata that is linked to the content of interest. However these types of metadata are not currently available for use in generating user interfaces for several reasons. First, the universe of service providers that offer metadata is fragmented with various vendors supplying only a limited subset of the metadata information and usually in proprietary form. Second, to utilize these types of metadata would require sophisticated software processing that links the disparate pieces of metadata into a unifying set that is easy to consume by, for example, typically lower-end client devices in the home (e.g., set-top boxes). This type of sophisticated software processing has not yet been realized.

Accordingly, it would be desirable to provide metadata brokering servers and methods which enable the capturing, processing, synthesizing and forwarding of metadata suitable to enable advanced user interfaces to be generated.

SUMMARY

Systems and methods according to the present invention address these needs and others by providing rich multimedia metadata usable to generate, e.g., sophisticated entertainment user interfaces in the home. These methods and systems can be implemented as a server-based software application that feeds multiple, diverse clients. The server functionality could be distributed, even co-located physically with one or more clients, or centralized. The server aggregates, filters, validates, augments and links metadata from disparate sources. The server transforms the metadata into a more manageable and extensible internal format. The server communicates with client devices using a schema-independent protocol, providing metadata in the appropriate format that suites the clients needs.

According to one exemplary embodiment of the present invention, a method for processing metadata information includes the steps of capturing metadata information from a plurality of different media sources, creating links between the captured metadata information, building a plurality of screen templates using at least one of the captured metadata and the links and distributing processed metadata including at least one of the plurality of screen templates, the links and the metadata to a plurality of different client devices.

According to another exemplary embodiment of the present invention, a method for processing metadata associated with media items includes the steps of receiving metadata from at least two sources, processing said received metadata to generate processed metadata and distributing said processed metadata.

BRIEF DESCRIPTION OF THE DRAWINGS

The accompanying drawings illustrate exemplary embodiments of the present invention, wherein:

FIG. 2 depicts another screen of a user interface which can be generated using metadata processed in accordance with the present invention;

FIG. 3 is a table showing exemplary metadata types and sources;

FIGS. 5, 5A and 5B show metadata sets being processed in accordance with an exemplary embodiment of the present invention;

DETAILED DESCRIPTION

The following detailed description of the invention refers to the accompanying drawings. The same reference numbers in different drawings identify the same or similar elements. Also, the following detailed description does not limit the invention. Instead, the scope of the invention is defined by the appended claims.

Figure 1:
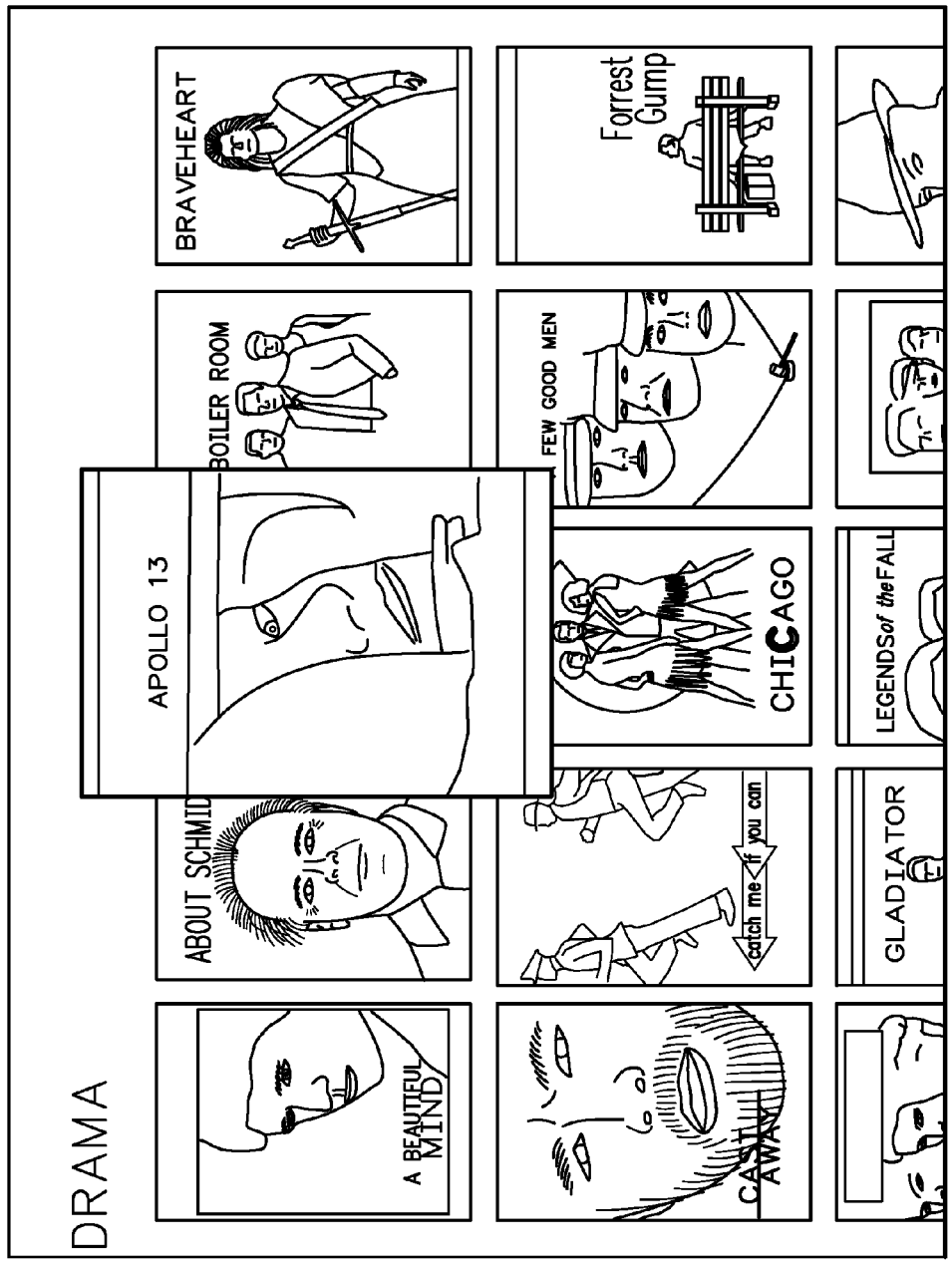
FIG. 1 depicts a screen of a user interface which can be generated using metadata processed in accordance with the present invention.

In order to provide some context for this discussion, an exemplary user interface screen which can be created using metadata brokered in accordance with exemplary embodiments of the present invention is shown in FIG. 1. Therein, a portion of a user interface screen has been magnified to show ten media selection items in more detail. For more information regarding this purely exemplary interface, including previous screens and navigation techniques, the interested reader is directed to the above-incorporated by reference U.S. patent application Ser. No. 10/768,432. However for the purposes of this specification, it is primarily useful to see an exemplary end result of metadata processing in accordance with the present invention.

Therein, the image associated with the media selection item for the movie "Apollo 13" has been magnified by, e.g., passing a cursor (not shown) over this image. Some metadata, e.g., the movie title and a representative image, can be used to generate this interface screen. At lower levels of the selection process, more metadata can be used. For example, as shown in FIG. 2, user selection of this magnified image, e.g., by depressing a button on an input device (not shown), can result in a further zoom to display additional details. For example, information about the movie "Apollo 13" including, among other things, the movie's runtime, price and actor information is shown. Those skilled in the art will appreciate that other types of information could be provided here. Additionally, this GUI screen includes GUI control objects including, for example, button control objects for buying the movie, watching a trailer or returning to the previous GUI screen (which could also be accomplished by depressing the ZOOM OUT button on the input device). Hyperlinks generated from metadata processed in a manner described below can also be used to allow the user to jump to, for example, GUI screens associated with the related movies identified in the lower right hand corner of the GUI screen of FIG. 20 or information associated with the actors in this movie. In this example, some or all of the film titles under the heading "Filmography" can be implemented as hyperlinks which, when actuated by the user via the input device, will cause the GUI to display a GUI screen corresponding to that of FIG. 2 for the indicated movie. Some or all of the information used to generate the interface screens of FIGS. 1 and 2 comes from metadata provided by one or more metadata providers and processed in accordance with exemplary embodiments of the present invention as will now be described.

The interface screens shown in FIGS. 1 and 2 are purely exemplary and metadata processed in accordance with the present invention can be used to support other interfaces or purposes other than interface generation. Likewise, many different types of metadata can be received and processed in accordance with the present invention. Examples of metadata types, sources and associated uses, e.g., for a TV browser interface, a video-on-demand (VOD) interface or a music browser, are shown in the table of FIG. 3.

Figure 4:
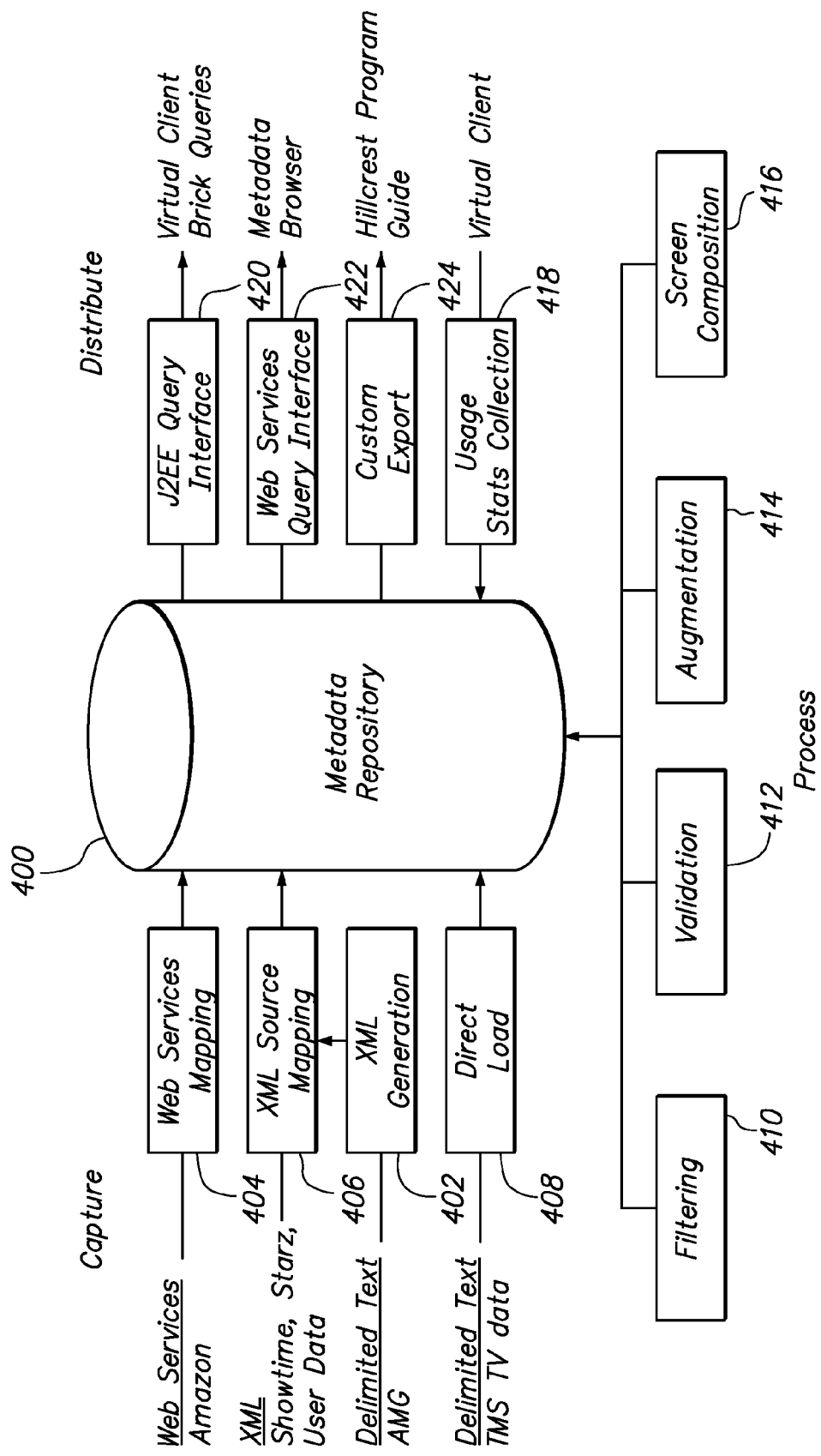
FIG. 4 shows an exemplary processing scheme for metadata according to exemplary embodiments of the present invention.

FIG. 4 depicts a functional architecture of metadata brokering technology according to exemplary embodiments of the present invention. Therein, a capture function receives metadata from multiple metadata providers, each supplying only a limited subset of the metadata which can be used to create a desired user interface. It will be appreciated that the metadata suppliers listed on the left-hand side of FIG. 4 are purely exemplary and that other metadata suppliers can be used in conjunction with the present invention. Since these metadata suppliers supply metadata using different languages and formats, exemplary embodiments of the present invention provide an interface which converts the received metadata into a consistent form, e.g., Extensible Markup Language (XML) at block 402, and then stores the converted metadata into the global metadata repository. In addition to language conversion of the raw metadata from the various sources, exemplary processing according to the present invention may also including remapping of the metadata as shown by blocks 404 and 406. For example, the exemplary Amazon metadata source can be connected to via their Web-Services API (AWS), as shown by block 404. Showtime supplies data in an XML format based on the Cablelabs 1.1 spec, which format is different than the Amazon Web Services format, as such, is mapped differently into a consistent format by block 406 prior to storage in the repository 400. In still other cases, e.g., if the processing requirements for conversion are too high, metadata can be loaded directly into the repository 400 without any conversion or mapping, as shown by block 408. Those skilled in the art will appreciate that other forms of conversion and mapping can be used depending upon the metadata source(s) used as inputs to the system.

Systems and methods according to exemplary embodiments of the present invention can also employ one or more rule-based engines that operate on the data that resides in the repository 400. These operations include, for example, filtering 410, validation 412, augmentation 414 and screen composition 416. The system post-processes the data after capture to filter out extraneous information. The filtering process evaluates the received metadata fields for relevancy with respect to the user interface screens to be generated. For example, if a received metadata field is never referenced by any of the screen rules used to compose a user interface screen, then that field can be filtered out and removed from the repository 400. If the user interface consisted solely of the exemplary screens shown in FIGS. 1 and 2, for example, and the capture function received a metadata field which provided information about a producer associated with the movie Apollo 13, then that metadata field can be deleted from the repository 400 by filtering function 410 since producer information is not used in these exemplary user interface screens. The validation process 412 ensures the accuracy of received metadata by correcting inconsistencies using multiple sources and custom heuristics to catch and correct errors. The validation process 412 can correct, for example, spelling, typographical mistakes, punctuation, and content inaccuracies in the received metadata. In ambiguous cases, the validation process can mark the questionable metadata field for human intervention and resolution. If an information element does not exist, then a rule is executed that governs missing information. This could involve an automated fix or flagging a human operator for intervention.

Various specific techniques can be used to perform validation of the received metadata depending upon, e.g., the type of error to be corrected and the information element under review. For example, numeric data fields can be validated for the range of permitted values. Missing metadata information elements can also be detected at this stage of the processing. If, for example, a DVD cover art image is missing from the received metadata for a particular media item, then the system could request a copy of the missing image from another repository (not shown). Typographical errors in, e.g., an actor's name, can be corrected as follows. First, the information element in the metadata associated with the actor's name can be separated into sub-fields e.g., last name and first name for actors' name fields. Then, a closeness fit can be generated with information which is already stored in the repository 400. If the received metadata name information is sufficiently close to a name which is stored in the repository then it can be automatically corrected. Alternatively, if the information is not already stored in the database, the received metadata can be stored in the repository 400 with a default confidence level. The confidence level can then be updated when subsequent matches are attempted during the validation of additional metadata. The confidence level can, for example, be based on a majority vote if the metadata associated with the same media item that is received from different metadata sources varies.

After filtering and validation, the system can run rules to augment the metadata with additional content and to synthesize new metadata as generally indicated by process block 414. Metadata augmentation is the process of synthesizing new information that is not present in the individual metadata feeds as well as modifying metadata captured from the various sources. Augmented metadata can, for example, be based on information from any or all of the data feeds, from other collected information such as usage metadata, or on information obtained from external sources. Examples of metadata augmentation include popularity and awards indications, similarity links between movies, and links to books and soundtracks from a movie. Augmented metadata associated with song popularity can, for example, be based on tracking the songs played by the system and creating rankings, while augmented metadata associated with similar movies can involve creating a crosslink between concepts that are otherwise not related. This crosslink can be based on a scoring process that would examine the number of common attributes, e.g. actors, directors, writers, subject topics, awards won, etc. The augmentation process 414 can be accomplished by building a set of inference rules that operate on a type of concept. After information related to that concept is brought in as part of the metadata capture process, these inferences rules run across the metadata repository and create new data and crosslinks dealing with that concept.

Metadata synthesis according to exemplary embodiments of the present invention further includes the linking of disparate metadata received from the various metadata sources. An example of metadata linking according to exemplary embodiments of the present invention is the creation of bi-directional links between movies and directors, actors, writers, etc. Such semantic links are useful for seamless navigational capabilities in client devices. Some examples are provided below, wherein the arrow refers to a link developed by the system from the metadata supplied by one or several metadata sources.

1. Friends (TV show)→Jennifer Aniston (actress)→Goodbye Girl (movie)
2. Skin (TV show)→Jerry Bruckheimer (producer)→Top Gun (movie)
3. A Beautiful Mind (Academy Award 2002)→Gladiator (Academy Award 2001)

One significant difference between one of the types of links created by the metadata augmentation process 414 according to the present invention and a conventional hyperlink is that these metadata links are restricted by both semantics and validity. Typically, a user interface screen is automatically generated and links are restricted to match a given semantic relevance (e.g., actors' names, award type, etc.). In addition, a particular crosslink may refer to a synthesized piece of metadata rather than a single piece of metadata received from a metadata source. For example, metadata associated with an actor's biography can be generated from multiple sources. In this case, the item being linked may not be an individual biography available from one of the metadata suppliers, but rather a synthesized one.

Yet another type of metadata which can be generated as a result of metadata augmentation is usage metadata. Usage metadata includes metadata associated with viewing habits and show ratings that enable the system to synthesize custom screens based on user behavior which can be collected via function 418. This information can be collected at the client side of the system and returned to a distribution or master metadata server as will be described below. Usage metadata can also many other types of data, e.g., advertisement statistics including ad viewing time, click-throughs, and response times. The system reports summary statistics on consumer usage of the various applications being run by the client devices. Raw usage information can include, for example, the following tuple (FROM, TO, ACTION, DURATION). Therein, FROM and TO can indicate the screen/element IDs, while ACTION can refer to either "select" or "move" actions performed by a user on a user interface screen. DURATION indicates the length of time in seconds that the user lingers on a particular interface screen. Since the capture of usage statistics is processing intensive, the system can employ filters to maintain the information at a manageable level. Examples of these filters are listed below.

1. Report usage information only for user interface screen transitions above a minimum duration threshold.
2. Save only "select" actions and not "move" actions as reportable usage information.
3. Capture only ad-relevant screens as usage information.
4. Summarize screen information into a 24-hour histogram of screen transitions.

Along with synthesizing new metadata, the system can also automate the adjustment of existing metadata as part of the augmentation process 414. Some of the metadata associated with content is relatively static such as title, year released, cast, etc. However, other metadata elements are more dynamic. As examples, the system can maintain instance metadata for entertainment content including price, availability, usage restrictions, and copy restrictions among others. Not only does the system allow these metadata elements to be automatically updated, but the manner in which the metadata is updated can be performed using customizable rules. Some examples of rules which can be used to modify metadata received from one or more of the metadata sources in FIG. 4 are provided below.

1. A movie's price can be different on Tuesdays vs. Fridays.
2. A movie's price is calculated differently based on the day of the week and how many movies the customer has ordered in the past week.
3. The system allows the user to download and copy a song for free if they meet purchase thresholds for a given week.

These examples are purely illustrative as any customizable rules can be applied to metadata content adjustment. It should be further noted that all of the metadata processing steps described herein can be performed in any order and can be performed prior to, or after, storage in a repository.

Figure 5B:
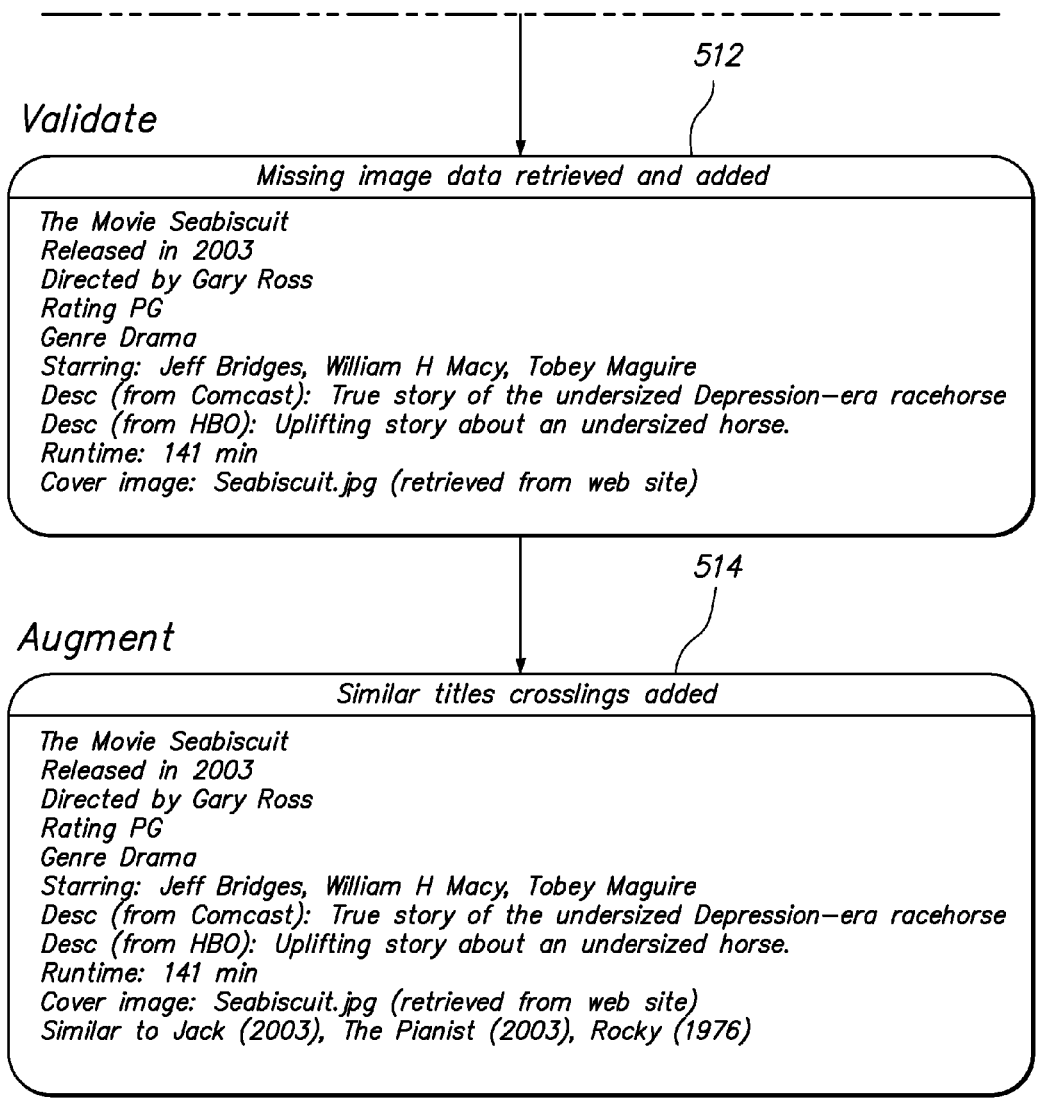

In order to better understand metadata processing according to exemplary embodiments of the present invention, consider the exemplary flow diagram of FIG. 5. Therein, two sets of metadata 502 and 504 are received from two different metadata sources. The two sets of metadata 502 and 504 relate to the same media selection item (the movie "Seabiscuit"), but have some different information elements (e.g., metadata set 502 contains a related book information element and metadata set 504 contains a runtime information element). In this example, the received metadata is first processed by filtering function 410, resulting in the modified metadata sets 506 and 508, respectively. In this example, the filtering function 410 operates to remove the information element to the related book from received metadata set 502 since that information element is not used in a user interface screen. The metadata set 508 is identical to the received metadata set 504 since the filtering rules applied to the received metadata set 504 indicate that all of the received metadata information elements have relevance.

Next, a mapping function is performed to merge the filtered metadata sets 506 and 508 into a unified metadata set 510 that is, in this example, consistent with other, similar metadata sets regardless of the metadata sources' individual formats and contents. In this example, the mapping function results in the "starring" information element reflecting an aggregation of the information received from the two metadata sources. Two separate description elements are added to reflect the source of the descriptive information.

The validation function 412 is then run on the mapped metadata set 510. This function determines that, for this illustrative example, the cover art image for the metadata set 510 is missing. Thus, an image is retrieved from a predetermined repository, e.g., located at a default web site, to fill in the missing metadata information element to generate a new metadata set 512. Lastly, in metadata set 514, an example of the augmentation function 414 is shown wherein the system identifies similar movies and inserts links to those movies as shown in FIG. 5.

After the received metadata is processed using some or all of the aforedescribed processing functions, it can then be used to generate screens, e.g., those illustrated in FIGS. 1 and 2, to enable user interfaces on client devices. Referring again to FIG. 4, the screen composition process 416 can also be implemented as a rule-engine function where the system creates custom screen elements and layout. This can include an automated screen build process whereby common navigational scenes are pre-computed and cached for quick distribution. This technique enables scaling the system to large numbers of client devices. While not all screens are typically pre-built, the system can serve a substantial majority of the subscriber base with these automated screens. However, exemplary systems and methods according to exemplary embodiments of the present invention also support more complex screen elements and layout. To generate such screens, rules can operate on all information elements in the global metadata repository 400. This includes domain-level metadata, service provider preferences, customer preferences/demographics/behavior, etc. These information elements can be combined and processed by the rule engine to provide custom screens for end user consumption. Typically, the system determines what data should be displayed on the screen and then adjusts the layout accordingly, an example of which will be described below with respect to FIGS. 6(a) and 6(b).

The determination of which screen data elements to use for a particular user interface screen can be automated using customizable templates. Exemplary templates for a user interface that enables movie item selections are "New Releases", "Box Office Hits" and "Academy Award Winners" templates which provide media selection items as the titles suggest, but many more templates can be created. Automatic screen composition is important as it facilitates the scaling of the service to large numbers of client devices. This is accomplished through having a number of templates which illustrate the type of information and linkages that are important. However, exemplary metadata processing systems according to the present invention provide for more than just static generic templates. The rule system enables the determination of screen elements through rules that operate on the universe of metadata in the global database. Some examples include the following.

1. The system provide can provide crosslinks to shopping items based on an entertainment content selected by a user, which crosslinks are generated based on rules. For example, the system can provides crosslinks that enables a user to purchase goods that were shown on the program "Sex and the City".
2. Rules can specify that "women's clothing" hyperlinks are provided on a portion of a user interface screen for certain demographics or "electronics products" hyperlinks, in the same screen area, for other demographics.
3. The system can return search queries that are biased towards user preferences, demographics, or behavior. For example, if the system determines that the user likes to watch John Travolta movies, then a search on "cowboy" could return an identifier for the movie "Urban Cowboy" over an identifier for the movie "Cowboy Up".
4. The system can return search queries that are biased towards service provider preferences. Soon to expire movies are returned in response to search results over new releases.

Along with the screen elements, the screen layout is also customizable. Thus, the screen templates are not limited to static versions but rather include dynamic templates that involve a series of rules. The rules describe, for example, what to do when the text field for the actors' names is too small to hold the relevant content from the processed metadata, the movie description field is too small to hold the relevant content or the cover art for the show is missing. Different rules may exist for different screen types, but an exemplary algorithm for screen layout is as follows. First, the availability of the images and text required to build the screen is verified. A rule can be provided which specifies the actions to take when a desired image or text is not available. The following are some possibilities for such rules: (1) leave the associated screen field blank, (2) insert a replacement object into the associated screen field, (3) insert a placeholder into the associated screen field, (4) remove the item from the screen, or (5) expand another region to fill in the area with the missing information. For example, if an advertisement image is unavailable, the system can insert a replacement image. If an actor or actress publicity photo does not exist, a male or female placeholder silhouette can be inserted into the associated screen region. The algorithm proceeds to check the size of the images and text fields to make sure they fit appropriately in their designated screen regions. Again, rules can be used govern appropriate actions when mismatches are identified. For example, these rules may indicate (1) expand the item, (2) shrink the item, (3) expand or shrink an adjacent region, or (4) make a replacement. Again, the decisions are based on customizable rules. Some other layout examples are as follows:
1. Display Julia Roberts first in the actor list since the user tends to watch her movies.
2. Display soon to expire movies more prominently.

Figure 6A:
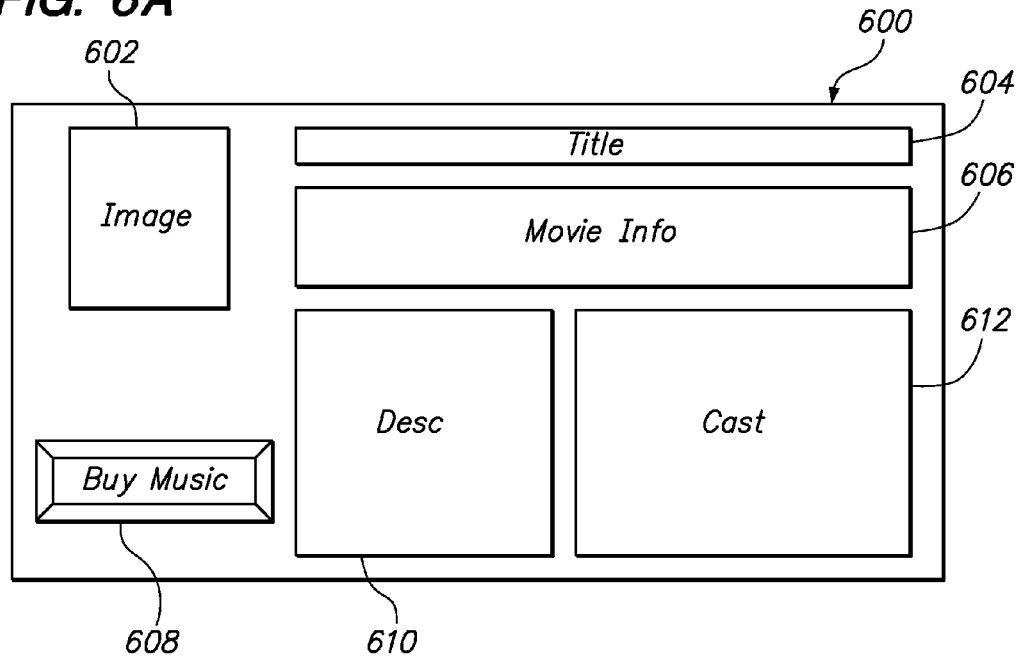
FIGS. 6A and 6B illustrate an exemplary screen composition generated according to an exemplary embodiment of the present invention.

As will be apparent from the foregoing discussion, exemplary embodiments of the present invention provide techniques for screen composition which use processed metadata in a flexible and effective manner such that both the information content and the layout are customizable and dynamically generated through a series of rules. In order to better understand the foregoing screen composition techniques in accordance with the present invention, an example will now be described with respect to FIGS. 6(a) and 6(b). Referring first to FIG. 6(a), when a screen is requested from a client device, a layout 600 can be generated by the system. This request can be made by, for example, selecting one of the media items displayed in a more general user interface screen, e.g., as shown in FIG. 1, using a handheld pointing device. Rules associated with, e.g., this particular client device and/or this particular user can be employed to select and/or place the screen elements shown in the figure, e.g., an image field 602, a title field, 604, a movie info field 606, a buy music button 608, a description field 610 and a cast field 612. For example, the buy music button 608 may be inserted into the layout 600 by virtue of a rule which examines this particular user's preferences, determines that this user likes music, inserts the button 608 and sizes the other screen elements accordingly.

Figure 6B:
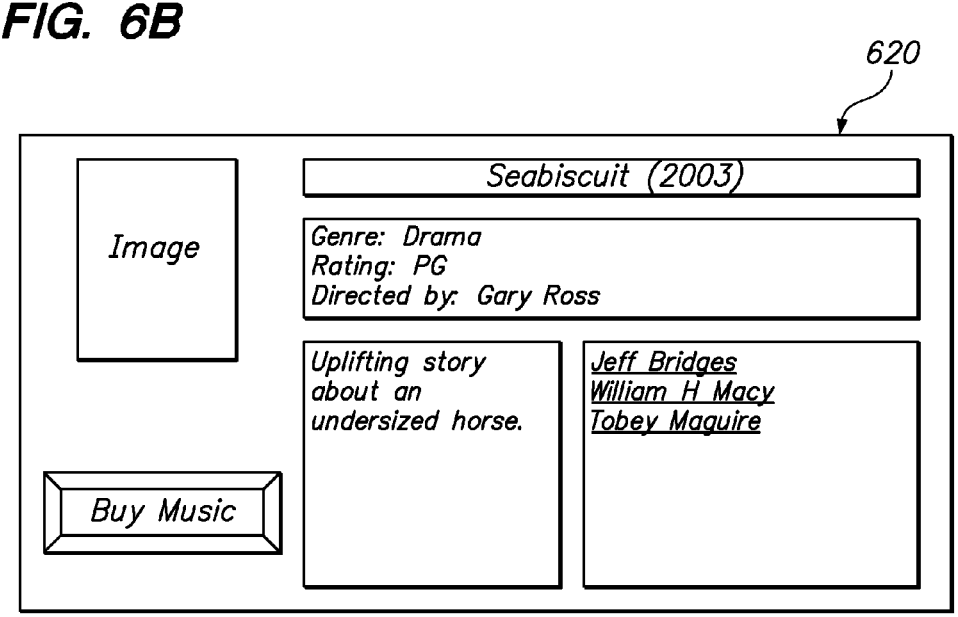

Once the layout 600 is determined, it can be populated using metadata stored in the repository 400 or in a local, cached version of the repository as will be described below. FIG. 6(b) shows an example of populating a screen using processed metadata according to an exemplary embodiment of the present invention, referring back to metadata processed in the example of FIG. 5 for the movie "Seabiscuit". In this example, the screen request was received from a user who was operating an interface that provided media selection of items provided by an HBO video-on-demand service provider and, accordingly, the populated screen 620 is generated using the description data provided from an HBO metadata source.

Returning again to FIG. 4, in addition to capturing and processing metadata from a plurality of metadata sources, techniques and systems according to the present invention also distribute the processed metadata to various client devices. Distribution of processed metadata can be based on queries from the various clients and, therefore, the query interfaces 420-424 may vary dependent on the system context and/or the clients' capabilities. According to exemplary embodiments of the present invention, the system can communicate metadata information to clients using a schema-independent protocol. This feature enables the software code for client devices to be very generic since the client does not need to know the source nor schema of the information being requested. For example, the client can process HBO movie metadata and Movielink movie metadata in the same way.

A schema-independent interface 420-424 is based on the type of information stored rather than being specific to the allowable set of fields that are stored, based on the storage schema. In a schema-independent interface, the information as to what types of information are stored would be explicitly stored in the system, but any new information can be stored in the database without having to recode the application. For example, if metadata brokering systems and techniques according to the present invention are extended to enable storing information about automobiles, it will not be necessary to recode a server to be able to store information pertaining to the gas mileage for cars, or information pertaining to car accessories. Exemplary embodiments of the present invention provide for three primary types of metadata content to be stored in the metadata repository 400, e.g., (1) facts about metadata concepts, (2) crosslinks between metadata concepts and (3) media related to the metadata concepts, e.g., such as audio, video and images. Retrievals of fields from the repository 400 are then based on which of these three categories the field contains, not on the specific field. This feature enables, among other things, for dynamic concepts and fields to be added to the system without modification of the underlying core software.

Figure 7:
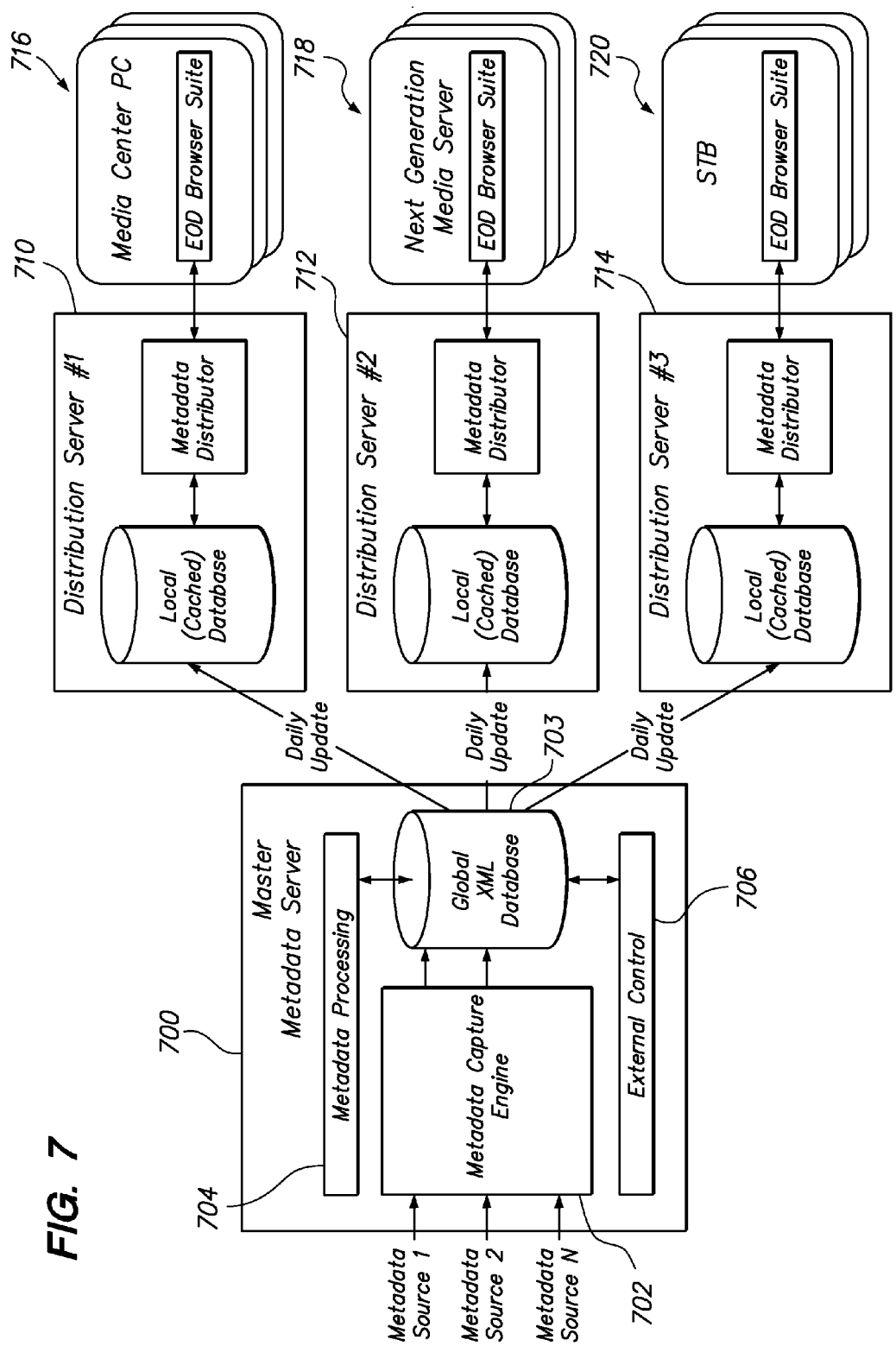
FIG. 7 illustrates an exemplary architecture for metadata brokering according to an exemplary embodiment of the present invention.

Distribution of processed metadata may also involve different physical distribution nodes, an example of which is provided as FIG. 7. Therein, a master metadata server 700 is responsible for interfacing with the metadata suppliers, implementing the data capture function described above using a capture engine 702, and maintaining the repository, e.g., a Global XML database 703. It should be noted that the examples used herein referring to XML databases as repositories for metadata are purely exemplary and that any type of storage facility or database can be used in place thereof.

Metadata processing, e.g., including filtering, validation and augmentation, is performed by processing unit 704 as described above. Distribution servers 710, 712 and 714 are responsible for the screen composition and distribution functions described above in this exemplary embodiment of the present invention. This provides for multiple distribution servers each having their own local cached version of the database and each responsible for communicating with their respective client device set to enable different types of client devices to be serviced in different ways, e.g., in accordance with their capabilities. Examples of client devices having different capabilities such that it may be desirable to associate them with different distribution servers include Media Center PCs 716, Next-Generation Media Servers 718, and Set-top Boxes (STBs) 720.

FIG. 7 also shows that the master database server 700 and distribution servers 710, 712 and 714 are periodically synchronized, e.g., daily. When the master metadata database 703 changes, it notifies its associated set of distribution servers 710, 712 and 714. The updated records are transported to the distribution servers and applied to the cached databases. The distribution servers are aware of the records that have changed and update the pre-built screens that are affected. The system can utilize double-buffering on the database such that updates occur in parallel and without slowing down retrieval requests. Screens and templates are built by the system for common content that is available for all users. However, content may also be available locally if the user has local disk storage as found, for example, on personal video recorders (PVRs). According to exemplary embodiments of the present invention, when browsing and selecting content from an interface, the location of the content should be transparent to the user. To facilitate this capability, the system stores basic metadata for all content recorded in the home. When the client device searches for content, it examines its local metadata store (if any) first. Then the client requests the search result screen from the system, while notifying the system of any local content that satisfied the search criteria. The system responds with enough additional content to create the full screen and supplies any additional, processed metadata necessary for the local content. Note that in all exemplary embodiments described herein, caching at any stage of metadata distribution is purely optional depending upon the particular implementation. As an alternative, all metadata could be stored at the master metadata server 700 without any caching downstream.

Figure 8A:
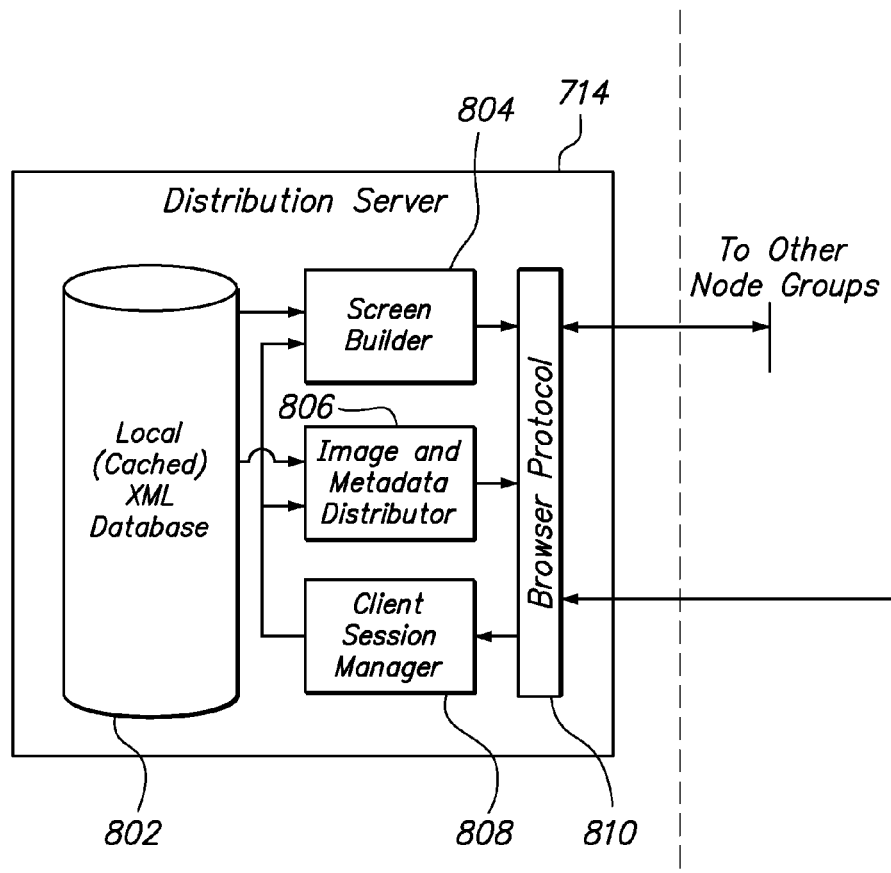
FIGS. 8, 8A and 8B show a portion of the exemplary architecture of FIG. 7 in more detail.
Figure 8:
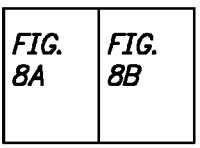
Figure 8B:
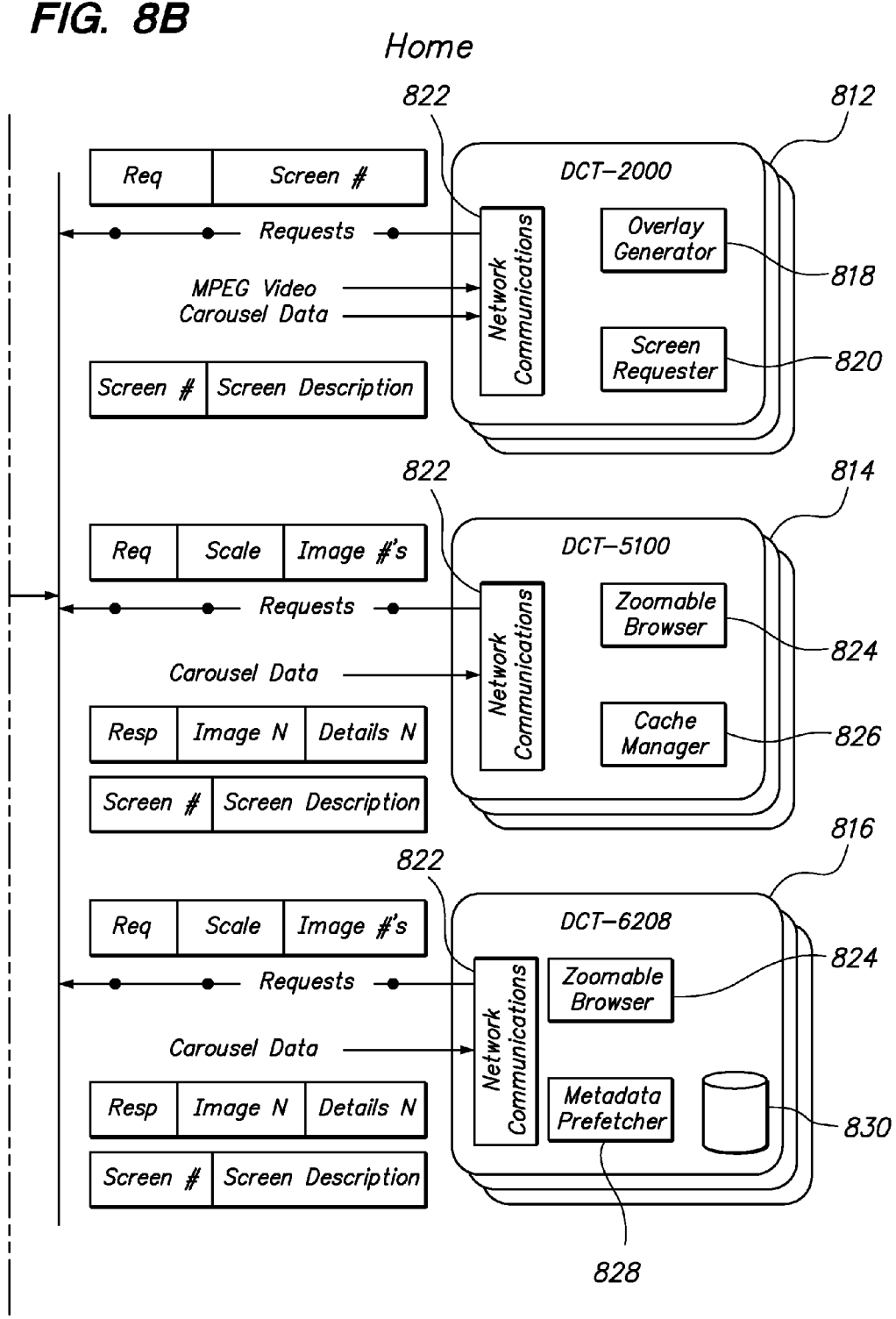

An exemplary architecture for performing these functions is seen in FIG. 8. Therein, the distribution server 714 is shown in more detail and includes a local (cached) XML database 802 that is updated periodically by the master metadata server 700, a screen builder 804 which implements screen composition as, for example, described above, an image and metadata distributor which forwards metadata to clients from the local database 802 in response to requests and a browser protocol interface which translates requests and responses based on the various browsers employed by the client devices. Requests for specific screens from a client 812 to the distribution server 714 can be passed through a client session manager 808 to the screen builder 804.

The client devices 812, 814 and 816 have increasing capability levels which enable them to operate differently with respect to interface generation according to the present invention. Specifically, but purely as an example, client devices 812-816 may vary with respect to: (1) the screen size and resolution of the display devices through which they interact with a user, 2) network connectivity, 3) CPU power and 4) storage capabilities. For example, a client's display capabilities could range from a 52" plasma, high-definition TV set, to a 20" standard TV set, to a cell phone's display screen. Similarly, the network connectivity between the distribution server 714 and its associated client devices could range from slow to fast, and would govern, for example, how much information to send down and when to send that information. Stronger client CPUs may download more raw information and process it locally, while weaker CPUs would rely on the server 714 to do more processing. Likewise, if the client device 812-816 has larger available storage, then more data could be downloaded prior to use and stored locally, speeding up local requests.

These aspects of varying types of client devices are exemplified in the different client devices shown in FIG. 8. Therein, client devices 812 represent lower-end clients (e.g., DCT-2000 STBs) having an overlay generator 818 and a screen requester 820 capability. The overlay generator 818 operates to place graphics on top of an MPEG video stream received from the distribution server 714 to generate a user interface at the client 812, while the screen requester 820 requests new screens from the distribution server 714 by sending requests referencing screen numbers to the distribution server 714 via a network communications interface 822. Since the clients 812 may have limited local processing power and/or storage capabilities, most or all of the interface screens which are displayed on the display devices (not shown) associated with the clients 812 can be generated using explicit data (e.g., detailed screen descriptions) returned by the distribution server 714 in response to the requests. Moderately powerful client devices 814 (e.g., DCT-5100 STBs) may be able to support both localized processing of the zoomable browser 824 (described, e.g., in the above-incorporated by reference patent application) as well as a localized cache 826 of metadata and/or screen descriptions usable to generate specific screens locally. Instead of requesting entire interface screens in response to user activity on their associated user interfaces and display devices, clients 814 may request specific images which are not stored locally as well as scaling information in order to generate their interface screens, as shown. Lastly, even more powerful clients 816 (e.g., DCT-6208 STBs) may include a metadata prefetcher 828 which anticipates a user's possible interactions with the interface and prefetches the metadata which would be used to generate screens that are candidates for next-selection. Other combinations of signaling and capability utilization of different clients are also within the scope of the present invention and those shown in FIG. 8 are purely exemplary.

Another feature of exemplary embodiments of the present invention, is the handling of rights associated with the metadata being processed by the system. Typically the content of interest (e.g., a movie) has digital rights management details associated with it including, for example, a purchase window, a viewing window and/or copy restrictions. However, the metadata itself often has its own set of rights. Systems and methods according to the present invention also manage these metadata rights. Metadata rights include, but are not limited to, the following types of attributes: consideration, extent and types of users. Consideration relates to the compensation or agreements that need to be in place for metadata access. Extent refers to "how long", "how many times", or "under which circumstances". User type enables rights to be applied to different segments of the user population.

The system keeps track of metadata rights management through a set of attributes in a table, which table can be part of the repository 400 or associated therewith, having, for example, the following elements: (1) Licensor, (2) Metadata Identifier, (3) Licensing Window, (4) Security Level, (5)

Usage restriction rules, (6) Reporting rules, (5) Subscriber View Limit, (6) Subscriber View Period, and (7) Maximum Viewing Period. This list indicates that these elements are not just a set of attributes, but also encompass a set of rules that are evaluated by a rules engine. The system manages and applies these rights at various points in the metadata handling process. As an example of this, referring to the processed metadata from FIG. 5, would be for the HBO sourced metadata to be authorized for use only by HBO customers. When a non-HBO customer requests a detailed view of a media selection item in her or his user interface associated with the movie "Seabiscuit", the metadata server 700, distribution server 714 or client device 812-816 which is responsible for supplying the metadata content would use the movie description that was supplied by the Comcast metadata source, as well as only the actors listed from that source. Any information that came from both sources would be displayable, but no information that was only supplied by HBO would be available for use.

Note that in this exemplary embodiment of the present invention, that the system logically treats the rights and the corresponding metadata as an atomic unit. The metadata cannot be rendered, transported, or transformed without access to its associated rights. This feature is facilitated by encrypting the metadata using symmetric key technology. Access to the key is governed through its rights definition. When the licensing window for the metadata expires, the metadata is purged from all databases (global, distribution, local). Communication between the network elements is not required, as each element handles this through the use of local timer controls. Distribution servers re-build the common, cached screens if they were affected by the expiry.

In addition to metadata rights management, as will be appreciated by those skilled in the art, media content may have authorizations for access in the form of, e.g., parental controls preferences. Parental controls include content characteristics, user preferences and content access codes. According to exemplary embodiments of the present invention, the metadata (in addition to the underlying content itself) may also have its own set of authorizations based on parental controls. The system keeps track of metadata authorizations including, for example, acceptable ratings of the content for metadata display, disallowed keywords, and user preferences for display handling. Metadata parental controls would have the following elements: (1) ratings not acceptable for display, (2) disallowed keywords, (3) metadata components to that are prohibited for display (e.g. images, descriptions, all fields), and (4) preferences for handling displays that include prohibited metadata. For example, a user may set up metadata parental controls to prohibit movie descriptions for R rated movies and to prohibit the entire metadata record for NC-17 rated movies. When an interface screen containing a list of movies containing both an R and an NC-17 movie is requested, the R movie would appear in the list, but the NC-17 movie wouldn't show up at all. Then when a detailed view of the R movie is requested, the resultant screen would include the movie's title, release year, genre and cast, but the description would not be present in response to metadata controls according to an exemplary embodiment of the present invention.

An exemplary process for handling metadata that is prohibited according to an exemplary embodiment of the present invention is the following:

1. If the user's preference for what is prohibited is a set of individual fields, then replace each prohibited data element in a field-specific way.
2. If the prohibited data is text, then replace it with blanks, or with a user-supplied alternative string, if available.
3. If the prohibited data is an image, then replace it with a transparent or background image, or an alternative image selected by the user.
4. If the prohibited data is audio or video content (e.g. a preview) then replace the triggering screen element with an alternative image.
5. If the user's preference is to prohibit the entire metadata record, then examine the type of display that references the metadata record.
6. If the type of display structurally requires the metadata record to be shown, for example a time-based TV grid, then replace the record reference with a non-linked text.
7. If the type of display is a list of metadata records, such as a display listing available content, then remove the reference entirely as if it did not exist.

When the parental control access code has been successfully supplied, then all metadata will be allowed.

In addition to metadata rights and controls, systems and methods according to the present invention can also keep track of many different types of preferences including user, programmer, operator, and advertiser preferences. User preferences include some elements that are handled through client-server communication and others that are handled by the client autonomously. Those that require server involvement include PIN processing for access control, shows of interest alerts, and reporting options for billing. Generic show filters and setup options (universal remote settings, interface skins, etc.) are managed by the client. Programmer preferences always require server involvement. Such preferences include user interface skins (layout, branding), linkages between content, reporting options, rule-based guide generation (based on user types/demographics), and cross platform control (internet, TV). Operator preferences are a subset of programmer preferences with the exception that cross-platform control does not make sense. Advertiser preferences include reporting options (aggregated by the server and raw information from the client), dynamic rule-based ad insertion, and an interactive toolkit.

Figure 9:
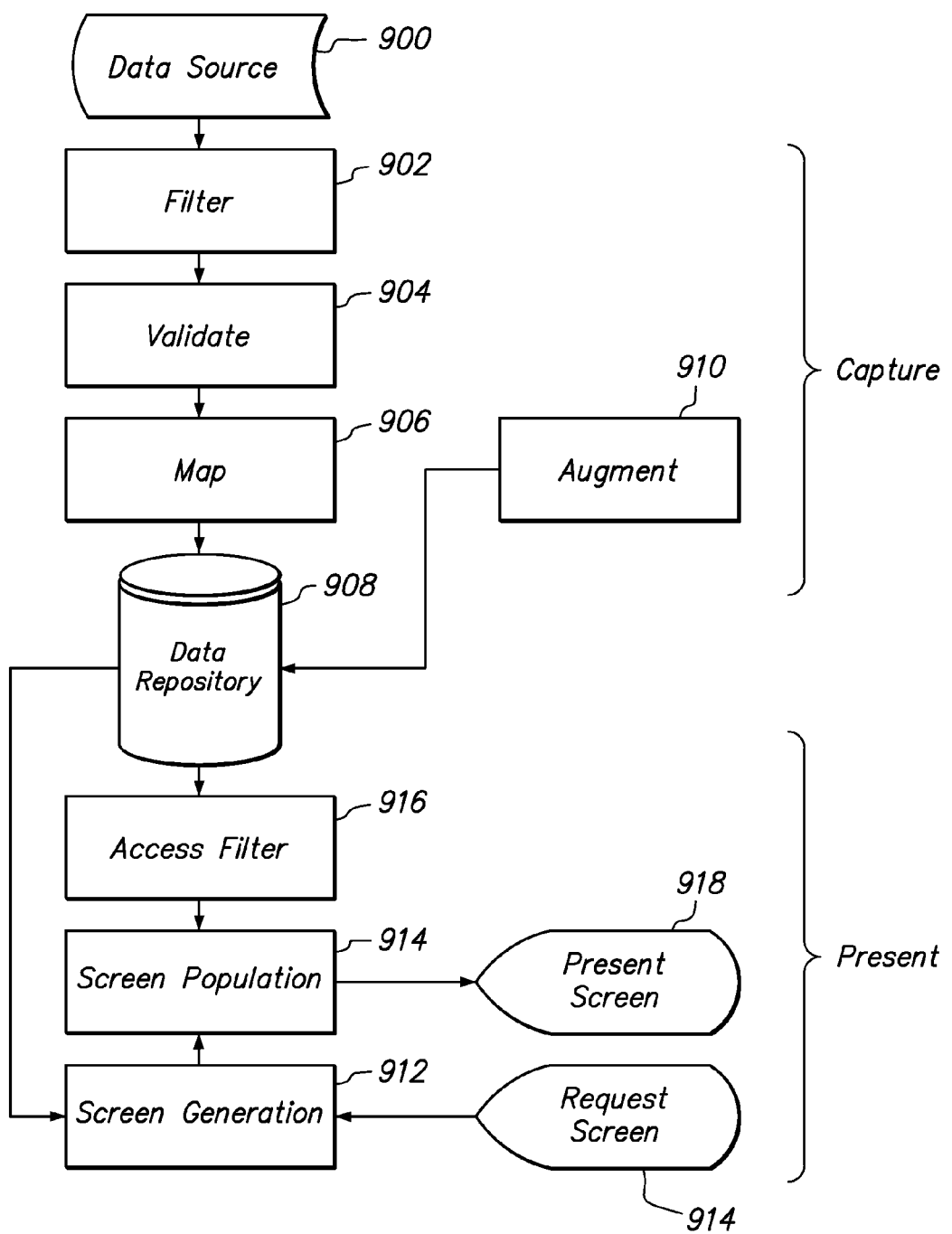
FIG. 9 is a flow diagram illustrating an exemplary method for processing metadata in accordance with an exemplary embodiment of the present invention.

To summarize exemplary techniques for metadata processing according to embodiments of the present invention, reference is now made to the flow diagram of FIG. 9. Therein, one or more metadata sources 900 supply metadata to be processed by one or more of the metadata master server 700, distribution servers 710-714 and/or client devices 812-816 in the manners described above. These functions include filtering to, e.g., remove irrelevant metadata, at step 902, validating to, e.g., ensure correctness of the relevant metadata, at step 904, and mapping to, e.g., provide consistency among stored metadata sets, at step 906, as part of a general metadata capture process according to exemplary embodiments of the present invention. The resulting metadata can be stored in a data repository 908 and augmented (step 910) as described above. The processed metadata can then be used for various purposes to present the processed metadata to various users. Among other things, it can be used to generate user interface screens (step 912) in response to screen requests 914 from client devices. The processed metadata can also be used to populate previously generated screens (step 914), which population process is optionally contingent upon filtering associated with, e.g., rights management and/or parental controls, as shown by step 916. The resulting screens may then be presented to the user as shown by step 918. It should be understood that the present invention separately includes aspects of each of the individual steps illustrated in FIG. 9 as well as two or more of the steps taken together. Moreover, the steps illustrated in FIG. 9 and described elsewhere in this specification may be performed in any desired order.

Systems and methods for processing metadata according to exemplary embodiments of the present invention can be performed by processors executing sequences of instructions contained in a memory device (not shown). Such instructions may be read into the memory device from other computer-readable mediums such as secondary data storage device(s). Execution of the sequences of instructions contained in the memory device causes the processor to operate, for example, as described above. In alternative embodiments, hard-wire circuitry may be used in place of or in combination with software instructions to implement the present invention.

The above-described exemplary embodiments are intended to be illustrative in all respects, rather than restrictive, of the present invention. Thus the present invention is capable of many variations in detailed implementation that can be derived from the description contained herein by a person skilled in the art. All such variations and modifications are considered to be within the scope and spirit of the present invention as defined by the following claims. No element, act, or instruction used in the description of the present application should be construed as critical or essential to the invention unless explicitly described as such. Also, as used herein, the article "a" is intended to include one or more items.

What is claimed is:

1. A method for processing metadata associated with media items, said method comprising:
   receiving metadata from at least two sources;
   processing said received metadata to generate processed metadata; and
   distributing said processed metadata, wherein said step of processing includes
      developing at least a first set of inference rules;
      reviewing the received metadata in view of said inference rules, and
      synthesizing new metadata based on the applicability of said first set of inference rules to said received metadata.

2. The method according to claim 1, wherein said step of receiving metadata comprises:
   capturing said metadata based on said first set of inference rules.

3. The method according to claim 1, wherein said step of synthesizing further comprises:
   creating links between and amongst said processed metadata, and wherein said links are restricted by both a semantic relevance between said processed metadata, and validity of said processed metadata.

4. The method according to claim 3, wherein said validity of said processed metadata is determined by correcting errors in said processed metadata.

5. The method according to claim 1, further comprising:
   building a plurality of screen templates using at least one of said processed metadata and said links; and
   distributing said processed metadata including at least one of said plurality of screen templates, said links, and said processed metadata, to a plurality of different client devices.

6. The method according to claim 1, wherein said step of receiving said metadata information further comprises:
   evaluating said received metadata for relevancy and accuracy to generate filtered metadata; and
   selectively storing said evaluated metadata in a database based upon a result of said evaluating step.

7. The method according to claim 1, wherein said step of distributing said processed metadata further comprises:
   distributing a first set of processed metadata to a first set of client devices having a first set of capabilities and distributing a second set of processed metadata to a second set of client devices having a second set of capabilities.

8. The method according to claim 7, further comprising:
   generating, at both said first set of client devices and said second set of client devices, a same displayed screen view based on said first set of processed metadata and said second set of processed metadata, respectively.

9. A method for processing metadata associated with media items, said method comprising:
   receiving metadata from at least two sources, wherein at least one of the two sources is a user device;
   processing said received metadata to generate processed metadata; and
   distributing said processed metadata, wherein said step of processing includes
      synthesizing new metadata from metadata corresponding to usage information reported by said user device.

10. The method according to claim 9, wherein said usage information comprises:
    viewing habits and show ratings reported by said user device.

11. The method according to claim 10, wherein said viewing habits comprises:
    at least one or more advertisement statistics, and at least one or more screen display statistics.

12. The method according to claim 11, wherein said advertisement statistics comprises:
    at least one or more of each of advertisement viewing times, click-throughs, and response times.

13. The method according to claim 11, wherein said screen display statistics comprise:
    at least one or more of transitions between interface screen elements, time spent on interface screen elements, and actions taken on interface screen elements.

14. The method according to claim 9, further comprising:
    filtering said usage information prior to said step of synthesizing new metadata.

15. The method according to claim 14, wherein said step of filtering comprises:
    reporting usage information for user interface screen transitions above a first predetermined threshold.

16. The method according to claim 14, wherein said step of filtering comprises:
    saving select actions and not-move actions as said usage information.

17. The method according to claim 14, wherein said step of filtering comprises:
    capturing only advertisement-relevant screens as said usage information.

18. The method according to claim 14, wherein said step of filtering comprises:
    summarizing screen information into a histogram of a first predetermined time threshold of screen transitions.

19. The method according to claim 9, further comprising:
    creating links between said received metadata information;
    building a plurality of screen templates using at least one of said received metadata and said links; and
    distributing said processed metadata including at least one of said plurality of screen templates, said links, and said processed metadata, to a plurality of different client devices.

20. The method according to claim 9, wherein said step of receiving said metadata information further comprises:
    evaluating said received metadata for relevancy and accuracy to generate filtered metadata; and
    selectively storing said evaluated metadata in a database based upon a result of said evaluating step.

21. The method according to claim 9, wherein said step of distributing said processed metadata further comprises:
  distributing a first set of processed metadata to a first set of client devices having a first set of capabilities and distributing a second set of processed metadata to a second set of client devices having a second set of capabilities.

22. The method according to claim 21, further comprising:
  generating, at both said first set of client devices and said second set of client devices, a same displayed screen view based on said first set of processed metadata and said second set of processed metadata, respectively.

23. A method for processing metadata associated with media items, usable to generate an interface, said method comprising:
  receiving metadata from at least two sources;
  processing said received metadata to generate processed metadata; and
  checking said processed metadata and determining that if at least one error exists in said received metadata that includes inconsistencies, correcting said inconsistencies in said received metadata using one or more sources and custom heuristics to catch and correct said inconsistencies.

24. The method according to claim 23, wherein said step of synthesizing comprises:
  creating links of disparate metadata received from said at least two sources, to create said synthesized new metadata.

25. The method according to claim 23, wherein said step of receiving metadata further comprises:
  receiving metadata from a first service provider and a second service provider, said second service provider being different than said first service provider.

26. The method according to claim 23, wherein said step of determining that at least one error exists in said received metadata comprises:
  correcting said at least one error by performing a closeness fit operation for determining similarity between said received metadata and metadata previously stored in a repository.

27. The method according to claim 23, further comprising:
  creating links between said received metadata information;
  building a plurality of screen templates using at least one of said received metadata and said links; and
  distributing said processed metadata including at least one of said plurality of screen templates, said links, and said processed metadata, to a plurality of different client devices.

28. The method according to claim 23, wherein said step of receiving said metadata information further comprises:
  evaluating said received metadata for relevancy and accuracy to generate filtered metadata; and
  selectively storing said evaluated metadata in a database based upon a result of said evaluating step.

29. The method according to claim 23, wherein said step of distributing said processed metadata further comprises:
  distributing a first set of processed metadata to a first set of client devices having a first set of capabilities and distributing a second set of processed metadata to a second set of client devices having a second set of capabilities.

30. The method according to claim 29, further comprising:
  generating, at both said first set of client devices and said second set of client devices, a same displayed screen view based on said first set of processed metadata and said second set of processed metadata, respectively.

31. A system for processing metadata associated with media items, said system comprising:
  a receiver configured to receive metadata from at least two sources; and
  a processor configured to
    process said received metadata to generate processed metadata, and
    distribute said processed metadata, and wherein said processor is further configured to
      develop at least a first set of inference rules based on a first concept,
      review the received metadata in view of said inference rules, and
      synthesize new metadata based on the applicability of said first set of inference rules to said received metadata.

32. A system for processing metadata associated with media items, said system comprising:
  a receiver configured to receive metadata from at least two sources, wherein at least one of the two sources is a user device; and
  a processor configured to
    process said received metadata to generate processed metadata, and
    distribute said processed metadata, and wherein said processor is further configured to
      synthesize new metadata from metadata corresponding to usage information reported by said user device.

33. A system for processing metadata associated with media items, usable to generate an interface, said system comprising:
  a receiver configured to receive metadata from at least two sources; and
  a processor configured to
    process said received metadata to generate processed metadata, and
    to check said processed metadata and determine that if at least one error exists in said received metadata that includes inconsistencies, said processor is further configured to correct said inconsistencies in said received metadata using one or more sources and custom heuristics to catch and correct said inconsistencies.

* * * * *